United States Patent [19]
Bates

[11] Patent Number: 5,836,212
[45] Date of Patent: Nov. 17, 1998

[54] INTERLOCKING GROMMET WITH GROSS HOLE AND METHOD OF ASSEMBLY

[75] Inventor: Wayne Bates, Grand Blanc, Mich.

[73] Assignee: Teleflex, Inc., Plymouth Meeting, Pa.

[21] Appl. No.: 859,969

[22] Filed: May 21, 1997

[51] Int. Cl.⁶ .................................................. F16C 1/10
[52] U.S. Cl. ........................ 74/502.6; 74/502.4; 248/73
[58] Field of Search ................................ 74/800.5–502.6; 248/73

[56] References Cited

U.S. PATENT DOCUMENTS

| | | | |
|---|---|---|---|
| 2,542,442 | 2/1951 | Weber ........................................ | 248/68 |
| 3,160,175 | 12/1964 | Laemmle . | |
| 3,162,412 | 12/1964 | McEntire . | |
| 3,229,026 | 1/1966 | Sulzer ................................. | 74/502.4 X |
| 3,505,900 | 4/1970 | Stahr ...................................... | 74/502.4 |
| 3,542,980 | 11/1970 | Hamilton ............................... | 74/502.4 |
| 3,564,113 | 2/1971 | Kindler . | |
| 4,002,821 | 1/1977 | Satoh et al. . | |
| 4,157,799 | 6/1979 | Simon ..................................... | 248/56 |
| 4,289,924 | 9/1981 | Pearce, Jr. et al. . | |
| 4,400,992 | 8/1983 | Londres ................................. | 248/68 R |
| 4,517,408 | 5/1985 | Pegram . | |
| 4,763,541 | 8/1988 | Spease .............................. | 74/501.5 R |
| 4,951,524 | 8/1990 | Niskanen ............................... | 74/502.4 |
| 4,959,509 | 9/1990 | Takeuchi et al. . | |
| 5,033,701 | 7/1991 | Kraus ................................... | 248/68.1 |
| 5,113,717 | 5/1992 | Plamper ................................. | 74/502.6 |
| 5,172,878 | 12/1992 | Lederman ................................ | 248/73 |
| 5,234,185 | 8/1993 | Hoffman et al. . | |
| 5,272,934 | 12/1993 | Chegash et al. . | |

*Primary Examiner*—Vinh T. Luong
*Attorney, Agent, or Firm*—Howard & Howard

[57] ABSTRACT

A motion transmitting remote control assembly for supporting a conduit (10) extending through an aperture in a support structure such as a firewall (14) in a vehicle comprising a conduit (10) and a flexible core element (11) movably supported by the conduit (10). The conduit (10) extends through a hole (20) in a grommet sector (18). The grommet sector (18) engages and is retained in the aperture in the support structure (14). The grommet sector (18) also has an edge (22) which extends between the extremities of the periphery of the grommet sector (18) and across the aperture for engaging a first grommet sector (18) with a second grommet sector (24). The second grommet sector (24) may have a hole (28) through which a second conduit (12) extends or a solid grommet sector (30) may completely seal the aperture. A method for assembling the motion transmitting remote control assembly comprises the steps of inserting the conduit (10) through the hole (20) in each of a series of first grommet sectors (18), disposing a solid grommet sector (30) in mechanical interlocking engagement with each of some of the first grommet sectors (18) for completely sealing the aperture, and disposing a second grommet sector (24) having a hole (28) and a second conduit (12) inserted through the hole (28). The second grommet sector (24) is in mechanical interlocking engagement with each of the remainder of the first grommet sectors (18).

7 Claims, 3 Drawing Sheets

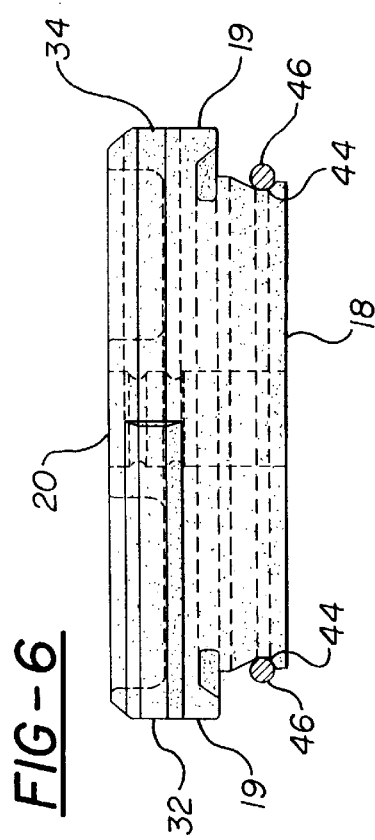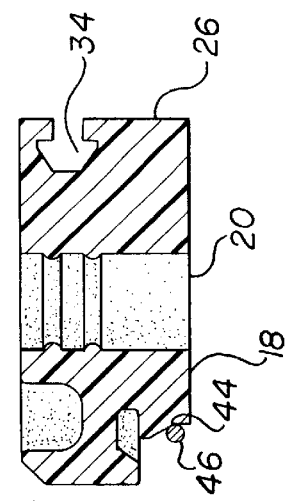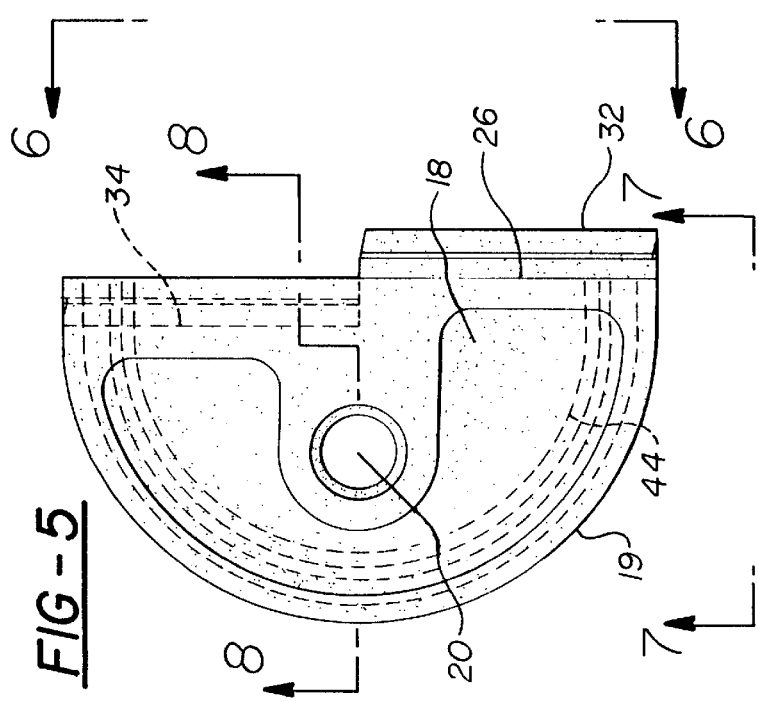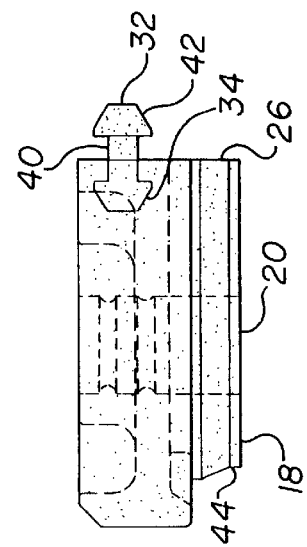

INTERLOCKING GROMMET WITH GROSS HOLE AND METHOD OF ASSEMBLY

TECHNICAL FIELD

This invention relates to a motion transmitting remote control assembly for supporting a conduit extending through an aperture in a wall, such as a firewall in a vehicle.

BACKGROUND OF THE INVENTION

Motion transmitting remote control assemblies having a conduit passing through a firewall of a vehicle must be supported properly to prevent damage to the conduit. The conduit movably supports a core element which extends from the vehicle engine compartment. The core element passes through the firewall to the console of the vehicle in order to connect controls in the engine compartment to controls in the passenger compartment. Conduits passing through the firewall control various functions in the vehicle such as acceleration, cruise control, transmission gear selection and drive selection between four wheel drive and two wheel drive.

It frequently occurs in assembly line production that varying numbers of conduits extend through an aperture in the firewall from vehicle to vehicle moving down an assembly line. For example, one vehicle may have one conduit extending through the aperture in the firewall whereas the next vehicle may require two conduits to pass through the like aperture in the firewall.

In the past, one grommet with one hole with the single conduit passing through that hole was preassembled to the conduit for installation in the single conduit vehicles, while one grommet with two holes and two conduits was preassembled for use in the two conduit vehicles. In order to accommodate both assemblies, both a single hole grommet and a two hole grommet were required.

The prior art discloses a grommet that supports the conduit by joining together grommet sections to form a hole for holding the core element in the grommet. A grommet of this kind is disclosed in U.S. Pat. No. 3,162,412 and U.S. Pat. No. 3,564,113. In U.S. Pat. No. 3,162,412 the core element is supported by each of two segments of the grommet. Similarly, in U.S. Pat. No. 3,564,113, two segments of the grommet are joined together to support the conduit. Each of the segments hold the conduit as it passes through the firewall.

SUMMARY OF THE INVENTION AND ADVANTAGES

A motion transmitting remote control assembly comprises a conduit and a flexible core element movably supported by the conduit. The assembly also includes a first grommet sector having a hole for supporting the conduit extending through the hole as the conduit passes through an aperture in a wall. The first grommet sector has a periphery for engaging and retaining the grommet sector in the aperture of the wall. The assembly is characterized by the first grommet sector having an edge extending between extremities of the periphery thereof and across the aperture for engaging with a second grommet sector.

The subject invention also includes a method of assembling the motion transmitting remote control assembly by inserting a conduit through a hole in each of a series of first grommet sectors with each conduit surrounded by and in sealing engagement with the assembled first grommet sector; disposing a second grommet sector in mechanical interlocking engagement with each of some of the first grommet sectors for completely sealing the aperture; and disposing a third grommet sector having a hole and a second conduit extending therethrough in mechanical interlocking engagement with each of the remainder of the first grommet sectors.

Accordingly, the subject invention allows the assembly of one half of a grommet with one conduit and combining that half with either a solid blank second grommet half or a third grommet half having a second conduit extending therethrough. In this manner, the first conduit may be assembled with one half of the grommet at one location and later assembled at another location.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a top view of a first grommet sector having a hole;

FIG. 6 is a view taken along line 6—6 of FIG. 5 of a first grommet sector with an O-ring disposed in a recess;

FIG. 7 is a view taken along line 7—7 of FIG. 5 of a first grommet sector; and

FIG. 8 is a view taken along line 8—8 of FIG. 5 of a first grommet sector with an O-ring disposed in the recess.

DETAILED DESCRIPTION OF THE PREFERRED EMBODIMENT

Figure 1:
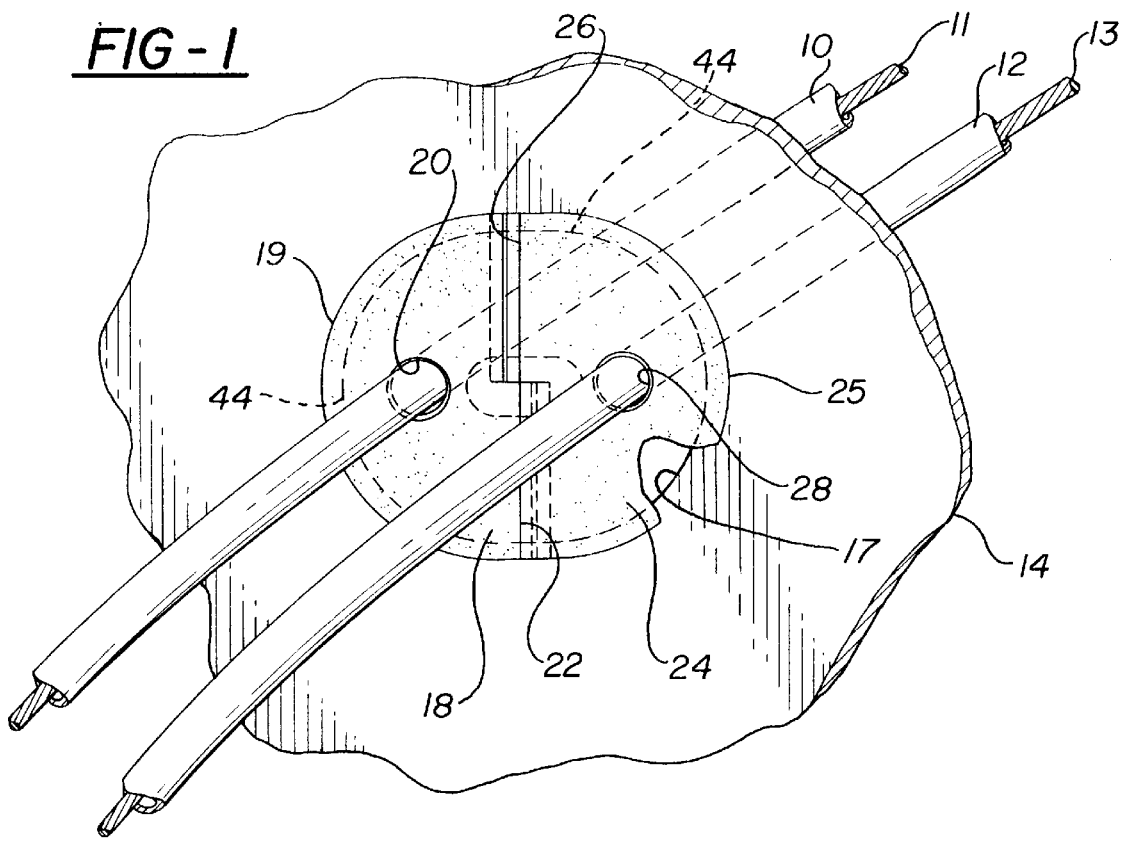
FIG. 1 is a fragmentary perspective view showing first and second conduits of the subject motion transmitting assembly extending through each of first and second grommet sectors disposed in an aperture in a wall.

Referring to the Figures, wherein like numerals indicate like or corresponding parts throughout the several views, a first motion transmitting remote control assembly comprises a first conduit 10 and a flexible core element 11 movably supported by the conduit 10. A second motion transmitting remote control assembly comprises a second conduit 12 movably supporting a second flexible core element 13.

The first motion transmitting remote control assembly extends through a firewall 14. The assembly also includes a first grommet sector 18 having a hole 20 through which the first conduit 10 extends. The first conduit 10 is supported by the first grommet sector 18 in an oval aperture 17 in the wall 14. The first grommet sector 18 has a periphery 19 for engaging and retaining the grommet sector 18 in the aperture 17 in the wall 14. The periphery 19 of the first grommet sector 18 is formed to fit and complement the edge of the aperture 17 in the wall 14. The secure fit seals the aperture 17 in the wall 14 and prevents undesirable dirt and moisture from passing through the aperture 17 in the wall 14.

The assembly is characterized by the first grommet sector 18 having a straight edge 22 extending between extremities of the periphery 19 thereof and diametrically across the aperture for engaging with a second grommet sector 24. The second grommet sector 24, like the first grommet sector 18, has a periphery 25 for engaging the grommet sector 24 in the aperture. The second grommet sector 24 also has a straight edge 26 for mechanical interlocking engagement with the edge 22 of the first grommet sector 18.

The edge 22 of the first grommet sector 18 is straight across the aperture 17 and connects with the second grommet sector 24 creating a secure fit between the two grommet sectors 18, 24. The fit between the two sectors 18, 24 must be close like the fit between the aperture 17 in the wall 14 and each of the first grommet sector 18 and the second grommet sector 24. To accommodate multiple conduits, the second grommet sector 24 can have a hole 28 to support the second conduit 12 extending through the hole 28 in the second grommet sector 24. The second grommet sector 24 is joined with the first grommet sector 18 to support a dual conduit 10, 12 system such as a four wheel drive vehicle having a transmission conduit 10 and a drive selector conduit 12 which pass through the firewall 14.

Figure 2:
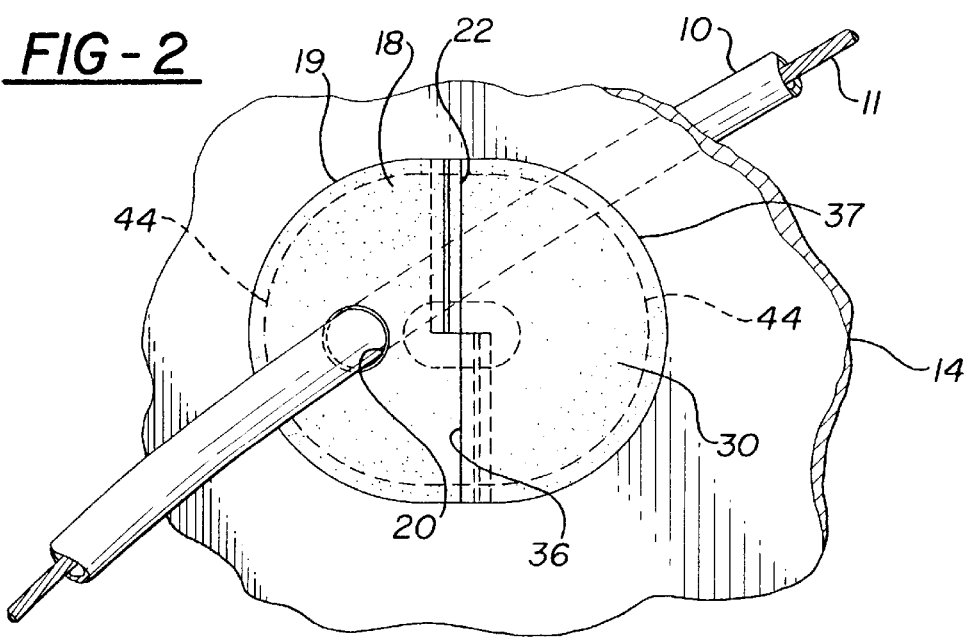
FIG. 2 is a fragmentary perspective showing the first conduit of the subject motion transmitting assembly extending through the first grommet sector and a solid second grommet sector in the aperture in the wall.
Figure 3:
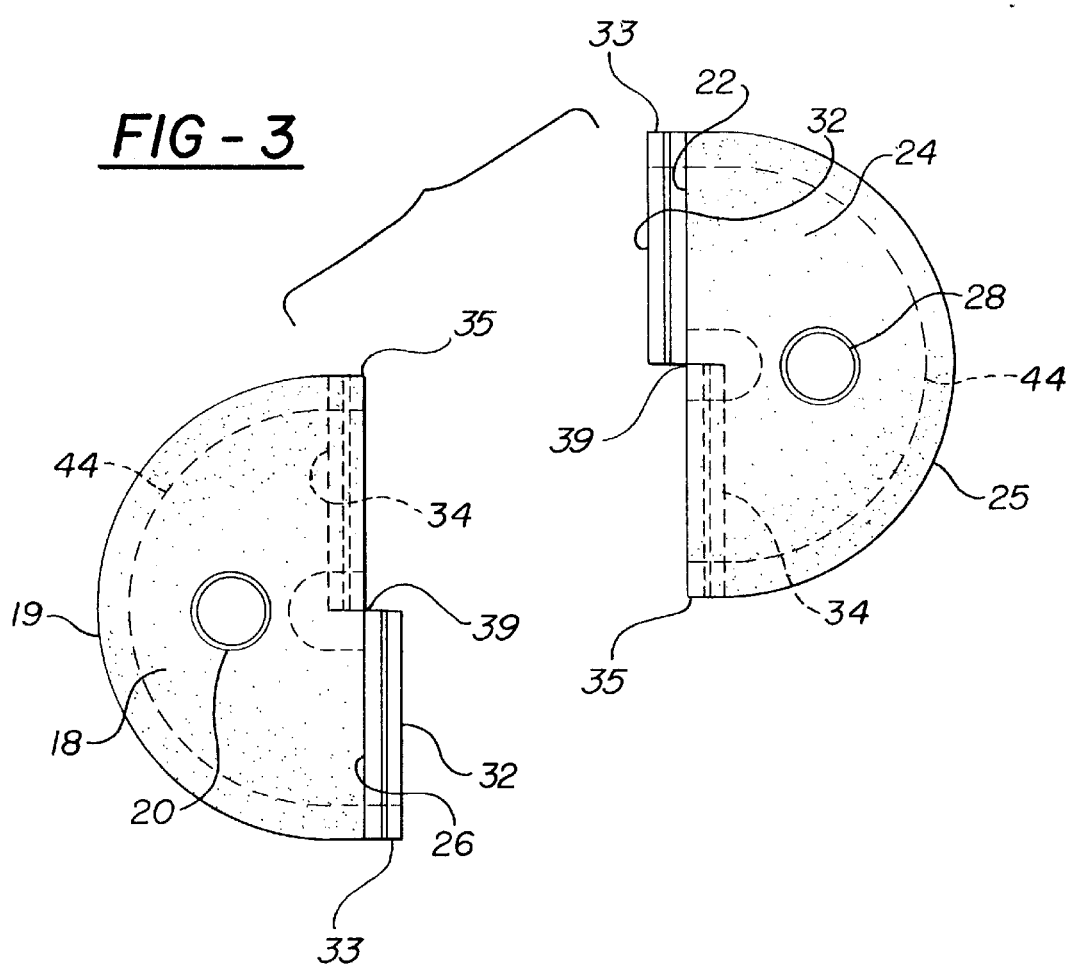
FIG. 3 is an exploded view of the first and second grommet sectors each having a hole.

An alternative assembly included in the subject invention is shown in FIG. 2 and includes a second grommet sector 24 that is solid (i.e. the second grommet is without holes) to entirely close the aperture. In this embodiment, the solid grommet sector 30 attaches to the first grommet sector 18 and only one conduit 10 passes through the assembled grommet sectors 18, 30 in the firewall 14 of the vehicle. This arrangement is suited for a single conduit 10 system such as a front or rear wheel drive vehicle which uses one conduit 10 for the transmission because it does not have a drive selector conduit 12 like the four wheel drive vehicle. Therefore, only one hole 20 is needed in the assembled grommet sectors 18, 30 to accommodate the front or rear wheel drive vehicle. The solid grommet 30 also includes a straight edge 36 for engaging with the first grommet sector 18.

In a preferred embodiment, the edge 22 of the first grommet sector 18 includes a tongue 32 and a groove 34 for mechanical interlocking engagement with the second grommet sector 24 which also has an identical tongue 32 and a groove 34. The tongue 32 and groove 34 of the first grommet sector 18 is complementary with the tongue 32 and groove 34 of the second grommet sector 24. In a like fashion, the solid grommet 30 also includes an identical tongue 32 and groove 34 along its straight edge 36, and a periphery 37.

In a more preferred embodiment of the subject invention, the edges 22, 26 and 36 of the grommet sectors 18, 24 and 30 have first 33 and second 35 ends at the intersections with the peripheries 19, 25 and 37, respectively, and a midpoint 39. The tongues 32 are integral with the edges 22, 26 and 36 and extend from the first end to the midpoint. The grooves 34 are formed within the edges 22, 26 and 36 and extend from the midpoint to the second end. In other words, the tongues 32 extend along one half of the edges 22, 26 and 36 and the grooves 34 extend along the other half. The grooves 34 have the same cross-sectional area configuration as the tongues 32 allowing the tongue 32 of the first grommet sector 18 to fit exactly into the groove 34 of the second and solid grommet sectors 24, 30 and vice versa (i.e., the tongues 32 and grooves 34 of each of the sectors interlock with each other.)

Figure 4:
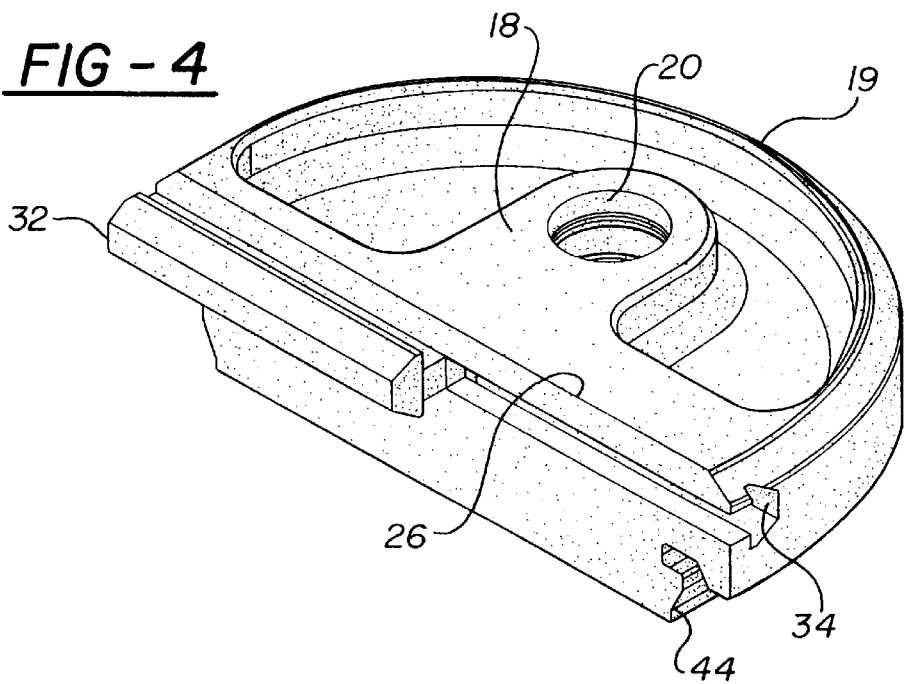
FIG. 4 is a perspective view of the first grommet sector having a hole.

As shown more specifically in FIG. 4, each of the tongues 32 have a neck 40 adjacent each of the edges 22, 26 and 36 of the sector and a flat topped triangular shaped head 42 attached to the neck 40. This specific embodiment provides an improved interlocking arrangement between the tongues 32 and the grooves 34. The interlocking tongues 32 can be a variety of shapes such as round, square, or any other shape that will allow the tongues 32 to slide and interlock with the grooves 34 to form an interlocking engagement. The shape of the tongues 32 can also differ from the shape of the grooves 34 as long as the tongues 32 can slide within the grooves 34. Other types of methods for joining the grommet sectors 18, 24 and 30 can also be utilized.

In addition, because each of the grommet sectors 18, 24 and 30 have grooves 34 extending halfway along the edges 22, 26 and 36 and tongues 32 extending along the remaining half of the edges 22, 26 and 36, the tongues 32 of the grommet sectors 18, 24 and 30 slide within the grooves 34 of the other respective grommet sectors 18, 24 and 30 simultaneously. This arrangement provides for an even more secure fit between the two grommet sectors 18, 24 and 30.

The grommet sectors 18, 24 and 30 each have a recess 44 about the peripheries 19, 25 and 37 to allow the grommet sectors 18 and 24 or 30 to be further secured together. As shown in FIGS. 6 and 8, an O-ring 46 is disposed in the recess 44 for firmly retaining the grommet sectors 18 and 24 or 30 in engagement with each other, i.e., in the manner of a band around a barrel. For example, after the first grommet sector 18 and the second grommet sector 24 are joined together by each of their interlocking tongues 32 and grooves 34, an O-ring 46 is placed around the two grommet sectors 18, 24 in each of their recesses 44. The recesses 44 for each of the grommet sectors 18, 24 are aligned such that the recesses 44 form the shape of an annulus around the joined grommet sectors 18, 24. The O-ring 46 fits taut around the recesses 44 in the manner of a rubber band, and provides an additional means for securely holding the two grommet sectors 18, 24 together. The sectors 18 and 30 may be held together in the same manner.

The grommet sectors 18, 24 and 30 can be made of rubber, but other synthetic and natural materials can be used. The core elements 11 and 13 can include solid metal wire made of stranded wire filaments or made of a similar arrangement of wire. The conduits 10 and 12 comprise an inner tubular member surrounded by wires or filaments about a long lead which are in turn surrounded by a plastic casing extruded about the wire. The wall 14 can be any type of support structure, e.g., a bracket. While each of the grommet sectors 18 and 24 may have one hole 20, it is possible for each of the grommet sectors 18 and 24 to have a plurality of holes.

The subject invention also includes a method of assembling. The method of assembling the motion transmitting remote control assembly comprises the step of inserting a conduit 10 through a hole 20 in each of a series of first grommet sectors 18 with each conduit 10 surrounded by and in sealing engagement with the periphery of the hole 20 in the first grommet sector 18. The next step is to dispose a second grommet sector 24 having a hole 28 and a second conduit 12 extending therethrough in mechanical interlocking engagement with each of some of the first grommet sectors 18 for extending two or more conduits through the aperture 17. However, in the case where only one conduit need pass through the aperture 17, a solid grommet sector 30 is disposed in mechanical interlocking engagement with each of the remainder of the first grommet sectors 18 for completely sealing the aperture 17.

The method also includes the step of simultaneously sliding a tongue 32 projecting from the edge 22 of the first grommet sector 18 into a groove 34 along the edge 26 of the second grommet sector 24 and sliding a tongue 32 projecting from the edge 26 of the second grommet sector 24 into a groove 34 along the edge 22 of the first grommet sector 18 for mechanically interlocking the first grommet sector 18 with the second grommet sector 24. With some of the first grommet sectors 18, the tongue 32 projecting from the edge 22 of the first grommet sector 18 may be simultaneously slid into a groove 34 along an edge 36 of the solid grommet sector 30 while a tongue 32 projecting from the edge 36 of the solid grommet sector 30 is slid into the groove 34 along the edge 22 of the first grommet sector 18. Simultaneously sliding the tongues 32 into the grooves 34 allows the two grommet sectors 18 and 30 to be securely joined together. The method of assembly provides for assembling two types of assembled grommet sectors: single hole and multiple holes.

In other words, the first grommet sector 18 can be joined with the solid grommet sector 30 whereby the assembled grommet sectors 18, 30 hold only one conduit 10 or the first grommet sector 18 can be joined with the second grommet sector 24 to hold two conduits 10 and 12.

Further, the method includes the step of retaining the first grommet sector 18 to one of the second or solid grommet sectors 24 or 30 by disposing an O-ring 46 around a recess 44 extending along the peripheries 19 and 25 or 37 of the assembled grommet sectors 18 and 24 or 30.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly comprising:
   a conduit (10);
   a flexible core element (11) movably supported by said conduit (10);
   a first grommet sector (18) having a hole (20);
   said conduit (10) extending through said hole (20) for supporting said conduit (10) in an aperture (17) in a wall (14);
   said first grommet sector (18) having a periphery (19) for engaging and retaining the grommet sector (18) in the aperture (17) in the wall (14);
   said first grommet sector (18) having a straight edge (22) extending across said first grommet sector (18) between extremities of said periphery (19) thereof; and
   a second grommet sector (24, 30) having a periphery (25, 37) for engaging and retaining the second grommet sector (24) in the aperture (17) and a straight edge (26, 36) in mechanical interlocking engagement with said edge (22) of said first grommet sector (18), whereby the entire periphery of the engaged first and second grommet sectors may be disposed in the aperture (17) in a wall (14).

2. An assembly as set forth in claim 1 wherein said edge (22) includes a tongue (32) and a groove (34) extending therealong for mechanical interlocking engagement with said second grommet sector (24) having a parallel and complementary tongue (32) and groove (34).

3. An assembly as set forth in claim 1 wherein said second grommet sector (24) has a different hole (28) and including a second conduit (12) extending through said hole (28) different in said second grommet sector (24).

4. An assembly as set forth in claim 1 wherein said second grommet sector (24) is solid to entirely close the aperture (17).

5. An assembly as set forth in claim 1 wherein said grommet sectors (18, 24) each include said edges (22, 26) having first (33) and second (35) ends and a midpoint (39), each of said edges (22, 26) having tongues (32) integral with said edges (22, 26) and extending from said first end (33) to said midpoint (39), and grooves (34) formed within said edges (22, 26) extending from said midpoint (39) to said second end (35), said grooves (34) having the same cross-sectional area configuration as said tongues (32).

6. A motion transmitting remote control assembly comprising:
   a conduit (10);
   a flexible core element (11) movably supported by said conduit (10);
   a first grommet sector (18) having a hole (20);
   said conduit (10) extending through said hole (20) for supporting said conduit (10) in an aperture (17) in a wall (14);
   said first grommet sector (18) having a periphery (19) for engaging and retaining the grommet sector (18) in the aperture (17) in the wall (14);
   said first grommet sector (18) having a straight edge (22) extending across said first grommet sector (18) between extremities of said periphery (19) thereof;
   a second grommet sector (24, 30) having a periphery (25, 37) for engaging and retaining the second grommet sector (24) in the aperture (17) and a straight edge (26, 36) in mechanical interlocking engagement with said edge (22) of said first grommet sector (18), whereby the entire periphery of the engaged first and second grommet sectors may be disposed in the aperture (17) in a wall (14), said grommet sectors (18, 24) each including a recess (44) extending along said peripheries (19, 25) thereof and an O-ring (46) disposed in said recess (44) for firmly retaining said grommet sectors (18, 24) in engagement with each other.

7. A motion transmitting remote control assembly comprising:
   a conduit (10);
   a flexible core element (11) movably supported by said conduit (10);
   a first grommet sector (18) having a hole (20);
   said conduit (10) extending through said hole (20) for supporting said conduit (10) in an aperture (17) in a wall (14);
   said first grommet sector (18) having a periphery (19) for engaging and retaining the grommet sector (18) in the aperture (17) in the wall (14);
   said first grommet sector (18) having a straight edge (22) extending across said first grommet sector (18) between extremities of said periphery (19) thereof;
   a second grommet sector (24, 30) having a periphery (25, 37) for engaging and retaining the second grommet sector (24) in the aperture (17) and a straight edge (26, 36) in mechanical interlocking engagement with said edge (22) of said first grommet sector (18), whereby the entire periphery of the engaged first and second grommet sectors may be disposed in the aperture (17) in a wall (14), each of said tongues (32) having a neck (40) adjacent said edges (22) and a flat topped triangular shaped head (42) attached to said neck (40).

* * * * *